US012754613B2

United States Patent
(12) United States Patent
Horikiri

(10) Patent No.: US 12,754,613 B2
(45) Date of Patent: Oct. 6, 2026

(54) BIOLOGICAL FEEDBACK DETECTION DEVICE, BIOLOGICAL SENSATION EXPANSION DEVICE, BIOLOGICAL SENSATION EXPANSION METHOD, AND COMPUTER PROGRAM PRODUCT

(71) Applicant: JVCKENWOOD Corporation, Yokohama (JP)

(72) Inventor: Kazuki Horikiri, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/241,475

(22) Filed: Jun. 18, 2025

(65) Prior Publication Data

US 2025/0315106 A1 Oct. 9, 2025

Related U.S. Application Data

(63) Continuation of application No. PCT/JP2023/045933, filed on Dec. 21, 2023.

(30) Foreign Application Priority Data

Dec. 21, 2022 (JP) ................................ 2022-203979

(51) Int. Cl.
*G06F 3/01* (2006.01)

(52) U.S. Cl.
CPC ................ *G06F 3/016* (2013.01); *G06F 3/01* (2013.01); *G06F 3/011* (2013.01); *G06F 3/014* (2013.01)

(58) Field of Classification Search
CPC . G06F 3/016; G06F 3/01; G06F 3/011; G06F 3/014
See application file for complete search history.

(56) References Cited

U.S. PATENT DOCUMENTS 9,858,773 B2 * 1/2018 Deschamps ....... H04M 3/42051
10,317,997 B2 * 6/2019 Osman ................. A63F 13/213
(Continued)

FOREIGN PATENT DOCUMENTS

| | | |
|---|---|---|
| JP | 2020-067693 | 4/2020 |
| WO | 2011/155089 | 12/2011 |
| WO | 2018/008217 | 1/2018 |

OTHER PUBLICATIONS

International Search Report and Written Opinion for International Application Serial No. PCT/JP2023/045933 mailed Feb. 20, 2024, 8 pages.

*Primary Examiner* — Michael J Jansen, II
(74) *Attorney, Agent, or Firm* — Amin, Turocy & Watson, LLP

(57) ABSTRACT

A biological feedback detection device, a biological sensation expansion device, a biological sensation expansion method, and a computer program product are provided that enable presentation of a variety of tactile stimulations. The biological feedback detection device according to the application concerned includes: a first stimulating unit that stimulates a tactile sensation in a first body part of a biological object; a second stimulating unit that stimulates a tactile sensation in a second body part of the biological object; a second stimulus sensation intensity measuring unit that measures a second stimulus sensation intensity indicating the intensity of the sensation of a stimulation felt in the second body part; and a stimulation intensity ratio calculating unit that calculates the ratio regarding whether the second stimulus sensation intensity corresponds to a stimulation applied to the first body part or corresponds to a stimulation applied to the second body part.

6 Claims, 6 Drawing Sheets

(56) References Cited

U.S. PATENT DOCUMENTS

| | | | | |
|---|---|---|---|---|
| 10,551,909 | B2 * | 2/2020 | Lee | G06F 3/011 |
| 10,976,821 | B2 * | 4/2021 | Yokoyama | A63F 13/25 |
| 11,334,226 | B2 * | 5/2022 | Yokoyama | G06F 3/011 |
| 11,397,466 | B2 * | 7/2022 | Beyhs | G06F 1/163 |
| 11,397,468 | B2 * | 7/2022 | Beyhs | G06F 3/017 |
| 2013/0093501 | A1 | 4/2013 | Kajimoto | |
| 2015/0235529 | A1 * | 8/2015 | Deschamps | G06F 3/016<br>340/407.1 |
| 2017/0262056 | A1 * | 9/2017 | Osman | G06F 3/0304 |
| 2017/0293348 | A1 * | 10/2017 | Lee | G06F 3/016 |
| 2019/0196596 | A1 | 6/2019 | Yokoyama et al. | |
| 2021/0004132 | A1 * | 1/2021 | Yokoyama | G06F 3/011 |
| 2021/0303068 | A1 * | 9/2021 | Beyhs | H03K 17/9645 |
| 2021/0303069 | A1 * | 9/2021 | Beyhs | G06F 3/014 |

* cited by examiner

FIG.4

151

| DATE AND TIME OF MEASUREMENT | FIRST-STIMULATING-UNIT CONTROL COMMAND VALUE | FIRST STIMULUS SENSATION INTENSITY MEASUREMENT VALUE | SECOND-STIMULATING-UNIT CONTROL COMMAND VALUE | SECOND STIMULUS SENSATION INTENSITY MEASUREMENT VALUE | ... |
|---|---|---|---|---|---|
| TIME#1 | FRCTR#1 | FRMES#1 | SCCTR#1 | SCMES#1 | ... |
| TIME#2 | FRCTR#2 | FRMES#2 | SCCTR#2 | SCMES#2 | ... |
| ... | ... | ... | ... | ... | ... |

FIG.5

152

| MODEL ID | MODEL DATA | ... |
|---|---|---|
| MID#1 | MDT#1 | ... |
| MID#2 | MDT#2 | ... |
| ... | ... | ... |

BIOLOGICAL FEEDBACK DETECTION DEVICE, BIOLOGICAL SENSATION EXPANSION DEVICE, BIOLOGICAL SENSATION EXPANSION METHOD, AND COMPUTER PROGRAM PRODUCT

CROSS-REFERENCE TO RELATED APPLICATIONS

This application is a Continuation of PCT International Application No. PCT/JP2023/045933 filed on Dec. 21, 2023 which claims the benefit of priority from Japanese Patent Application No. 2022-203979 filed on Dec. 21, 2022, the entire contents of both of which are incorporated herein by reference.

BACKGROUND OF THE INVENTION

1. Field of the Invention

The application concerned relates to a biological feedback detection device, a biological sensation expansion device, a biological sensation expansion method, and a computer program product.

2. Description of the Related Art

In recent years, a technology is being developed that, during a virtual reality (VR) experience, presents the tactile information in order to enhance the sense of immersion and to enhance the accuracy of illusion with respect to the real world. Moreover, there is a demand that, when there is loss of sensation in a predetermined body part, the sensation occurring in that body part is brought closer to other sensations.

For example, in International Publication Pamphlet No. 2018/008217 mentioned below is disclosed an information processing device that is capable of varying the output of the tactile stimulation in an adaptive manner according to the position information; and that includes an output control unit that controls the output of a tactile stimulation of at least two or more tactile stimulation units. According to predetermined position information and according to the information about the tactile sensation output related to that position information, the output control unit changes the output of the tactile stimulation units corresponding to the predetermined position information.

However, in the information processing device disclosed in Internation Laid-open Pamphlet No. 2018/008217, although the output of the tactile stimulation can be changed according to the position information, it is neither possible to give a feedback about a variety of tactile stimulations nor it is possible to present a variety of tactile stimulations corresponding to the feedback. Meanwhile, there is a high demand for tactile presentation while having a virtual reality experience, and various other tactile devices are also proposed. However, since the stimulation is applied only to the region in which the device is attached, it is difficult to cover a wider range such as the whole body.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A biological feedback detection device according to the present disclosure comprising: a first stimulating unit that stimulates a skin sensation in a first body part of a biological object; a second stimulating unit that stimulates a skin sensation in a second body part of the biological object; a second stimulus sensation intensity measuring unit that measures a second stimulus sensation intensity indicating intensity of sensation of a stimulation felt in the second body part; and a stimulation intensity ratio calculating unit that calculates a ratio regarding whether the second stimulus sensation intensity corresponds to a stimulation applied to the first body part or corresponds to a stimulation applied to the second body part.

A biological sensation expansion device according to the present disclosure comprising: a first stimulating unit that stimulates a tactile sensation in a first body part of a biological object; a second stimulating unit that stimulates a tactile sensation in a second body part of the biological object; a second stimulus sensation intensity measuring unit that measures a second stimulus sensation intensity indicating intensity of sensation of a stimulation felt in the second body part; a stimulation intensity ratio calculating unit that calculates a ratio regarding whether the second stimulus sensation intensity corresponds to a stimulation applied to the first body part or corresponds to a stimulation applied to the second body part; and a training unit that, based on the ratio, performs control to maintain intensity of a stimulation applied by the first stimulating unit, and at same time to reduce at least either intensity or frequency of a stimulation applied by the second stimulating unit and to enhance stimulus sensation intensity occurring in the second body part due to a tactile stimulation applied to the first body part by the first stimulating unit.

BRIEF DESCRIPTION OF THE DRAWINGS

FIG. 4 is a diagram illustrating an example of the information stored in a measurement value storing unit according to the application concerned;

FIG. 5 is a diagram illustrating an example of the information stored in a model storing unit according to the application concerned;

DETAILED DESCRIPTION OF THE PREFERRED EMBODIMENTS

An exemplary embodiment of the application concerned is described in detail with reference to the accompanying drawings. However, the present invention is not limited by the embodiment described below.

Figure 1:
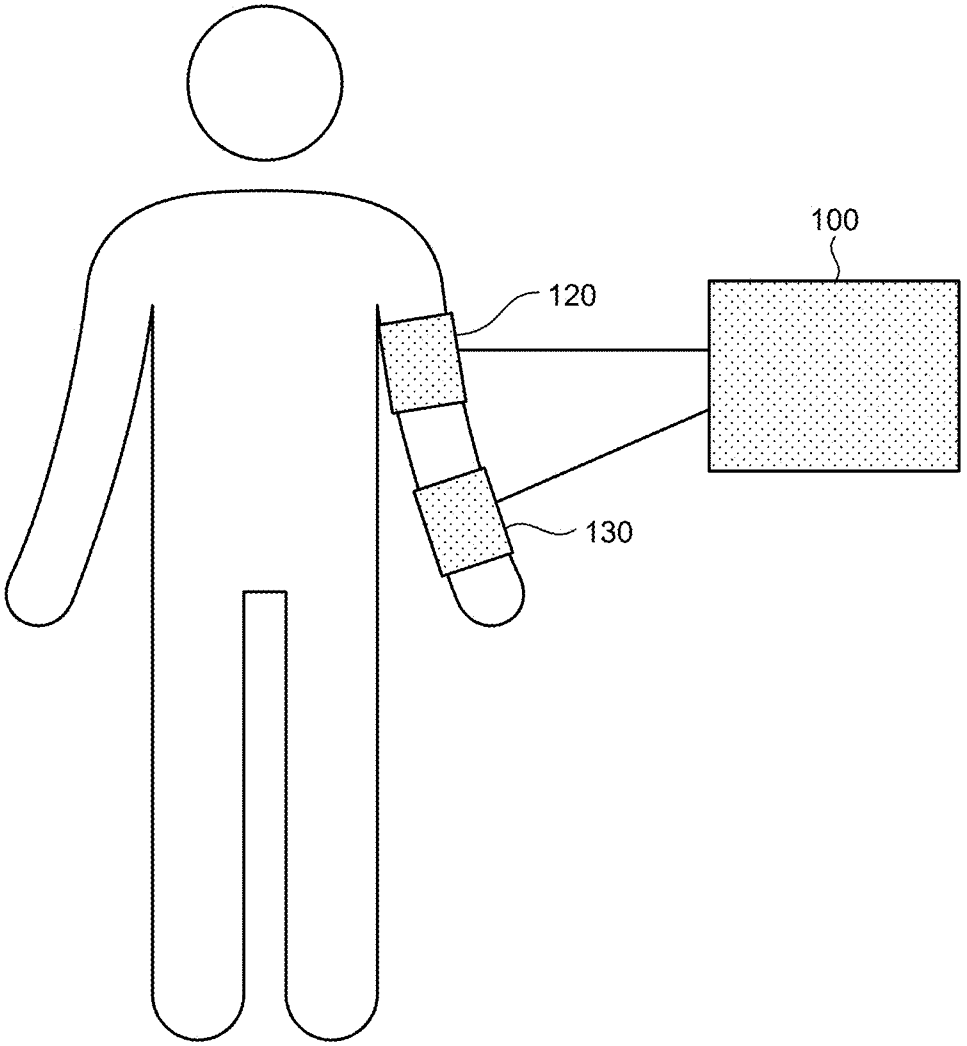
FIG. 1 is a schematic diagram of a biological feedback detection device or a biological sensation expansion device according to the application concerned.

Overview of Biological Feedback Detection Device or Biological Sensation Expansion Device Firstly, explained below with reference to FIG. 1 is the overview of a biological feedback detection device or a biological sensation expansion device according to the application concerned. FIG. 1 is a schematic diagram of the biological feedback detection device or the biological sensation expansion device according to the application concerned.

As illustrated in FIG. 1, a biological feedback detection device 100 (100A) or a biological sensation expansion device 100 (100B) according to the application concerned includes, for example, a first stimulation device 120 that is disposed on an upper arm representing a first body part above the elbow of an arm of a person, and a second stimulation device 130 that is disposed on a lower arm representing a second body part below the elbow of an arm of the person.

For example, the biological feedback detection device 100 (100A) stimulates the arm of the person using the first stimulation device 120 and the second stimulation device 130, and detects the stimulus sensation occurring also at a different body part other than the body part stimulated by the first stimulation device 120. Moreover, for example, the biological sensation expansion device 100 (100B) stimulates the arm of the person using the first stimulation device 120 and the second stimulation device 130, and makes the person feel the stimulus sensation occurring also at a different body part other than the body part stimulated by the first stimulation device 120. Herein, the first body part and the second body part are assumed to have a one-to-one correspondence. However, alternatively, the configuration can be such that, when a stimulation is applied to the first body part in one region, a stimulus is generated at a plurality of second body parts. Moreover, in the biological feedback detection device 100 (100A) or the biological sensation expansion device 100 (100B), it is possible to store mapping information that indicates the regions in the first body part and the second body part in which the stimulation occurs.

In the application concerned, a biological feedback implies that, when a stimulation is applied to some body part of a biological object, a stimulus sensation is generated at a different body part of the biological object due to the stimulation of the concerned body part. More particularly, a biological feedback implies that, when a skin sensation is stimulated in a particular body part of a biological object, a skin sensation is generated in a different body part. For example, a training is carried out in which, when a stimulation is applied to the first body part (the palm of a hand), a sensation of receiving the stimulation in the second body part (the elbow) is generated.

Configuration of Biological Sensation Expansion System

Figure 2:
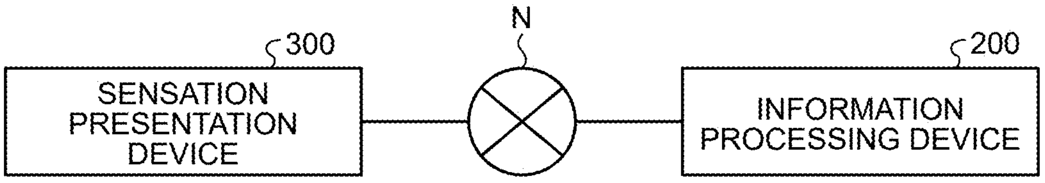
FIG. 2 is a diagram illustrating an exemplary configuration of a biological sensation expansion system according to the application concerned.

Explained below with reference to FIG. 2 is the overview of a biological sensation expansion system 1 according to the application concerned. FIG. 2 is a diagram illustrating an exemplary configuration of the biological sensation expansion system according to the application concerned. In FIG. 2 is illustrated a configuration of the biological sensation expansion system 1 meant for implementing a post-training virtual reality experience. As illustrated in FIG. 2, the biological sensation expansion system 1 according to the application concerned includes an information processing device 200, a sensation presentation device 300, and a network N. Meanwhile, the training can be performed using the biological sensation expansion device 100 (100B), and it is not always necessary to connect the biological sensation expansion device 100 (100B) to the network N. Hence, in FIG. 2, the biological sensation expansion device 100 (100B) is not illustrated. The biological sensation expansion system 1 presents a virtual reality stimulation, which is applied by the information processing device 200, to the user using the sensation presentation device 300. After the training is carried out by the biological sensation expansion device 100 (100B), not only the body part to which the sensation presentation device 300 is attached feels the stimulation, but the body parts to which the sensation presentation device 300 is not attached also feel the stimulation. After the training, the biological sensation expansion device 100 (100B) need not be connected to the network N since the training is completed. However, the biological sensation expansion device 100 (100B) can remain connected to the information processing device 200 via the network N. Even when connected to the information processing device 200, the biological sensation expansion device 100 (100B) can carry out the training by associating the videos and the audios present in the virtual reality. Regarding the constituent elements, simple explanation is given below in a sequential manner.

The biological feedback detection device 100 (100A) or the biological sensation expansion device 100 (100B) presents a tactile stimulation to the user using a commonly-used tactile stimulation presentation device, and carries out the training in such a way that, when a stimulation is applied to a single region, the same stimulation is felt in other regions too. Regarding the biological feedback detection device 100 (100A) or the biological sensation expansion device 100 (100B), the detailed configuration is explained later.

The information processing device 200 provides virtual reality experiences to the user. The information processing device 200 is installed with software for implementing various virtual reality experiences and, based on a user operation, sends a control command signal to the biological feedback detection device 100 (100A) or the biological sensation expansion device 100 (100B). For example, the information processing device 200 can be implemented using a personal computer (PC), a workstation (WS), or a computer equipped with server functions.

The sensation presentation device 300 presents, to the user, a tactile stimulation that is involved in the virtual reality experience provided by the information processing device 200. The sensation presentation device 300 is a commonly-used sensation presentation device and, as long as a sensation can be presented, need not be configured to detect a feedback or to carry out the training. When stimulated in one region by the sensation presentation device 300, the user who has been trained by the biological sensation expansion device 100B becomes able to feel the stimulation in other regions. Meanwhile, the sensation presentation device 300 can also be configured to double as a controller for the user during a virtual reality experience, or can double as the biological feedback detection device 100A or the biological sensation expansion device 100B.

The network N connects the biological feedback detection device 100 (100A) or the biological sensation expansion device 100 (100B) to the information processing device 200 in a mutually communicable manner using a wired connection or a wireless connection. In the case of a wired connection, the network N can be implemented using Ethernet (registered trademark) defined in IEEE 802.3. In the case of a wireless connection, the network N can be implemented using a wireless LAN (LAN stands for Local Area Network) defined in IEEE 802.11.

Meanwhile, the biological sensation expansion system 1 can be configured as an integrated device by integrating the sensation presentation device 300 that presents virtual reality sensations, the biological feedback detection device 100A, and the biological sensation expansion device 100B; and can carry out the training while being connected to the information processing device 200. Alternatively, the biological sensation expansion system 1 can be configured as an integrated device by integrating the biological feedback detection device 100A, the biological sensation expansion device 100B, the information processing device 200, and the sensation presentation device 300.

Configuration of Biological Feedback Detection Device

Figure 3:
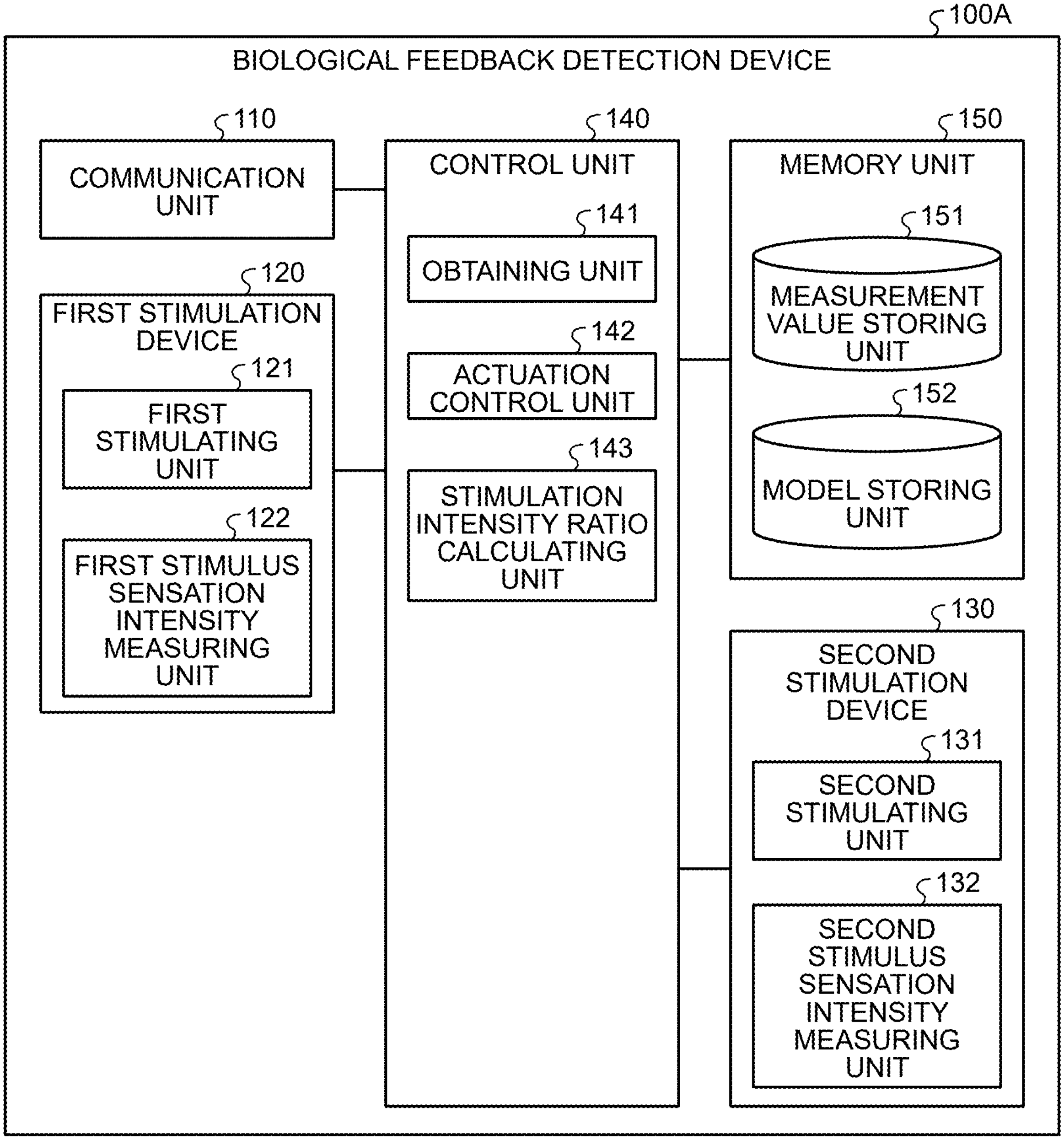
FIG. 3 is a diagram illustrating an exemplary configuration of the biological feedback detection device according to the application concerned.

Explained below with reference to FIG. 3 is a configuration of the biological feedback detection device 100A. FIG. 3 is a diagram illustrating an exemplary configuration of the biological feedback detection device according to the application concerned. As illustrated in FIG. 3, the biological feedback detection device 100A according to the application concerned includes a communication unit 110, the first stimulation device 120, the second stimulation device 130, a control unit 140, and a memory unit 150.

The communication unit 110 connects the inside of the biological feedback detection device 100A to the outside in a mutually communicable manner, and thus enables mutual communication of information between the inside of the biological feedback detection device 100A and the outside. For example, the communication unit 110 can be implemented using a wireless LAN card (LAN stands for Local Area Network), a Bluetooth (registered trademark) module, a Wi-Fi (registered trademark) module, or an antenna.

Regarding First Stimulation Device 120

The first stimulation device 120 stimulates skin sensations in the first body part of a biological object. Herein, a skin sensation can be a tactile sensation, a pressure sensation, a pain sensation, a cold sensation, and a warmth sensation. The first stimulation device 120 includes a first stimulating unit 121 and a first stimulus sensation intensity measuring unit 122. Regarding the constituent elements, the explanation is given below in a sequential manner.

The first stimulating unit 121 stimulates a skin sensation in the first body part of a biological object. For example, the first stimulating unit 121 can stimulate a pressure sensation to the first body part by pumping the air to a cuff, which is wound around the first body part, using a pump. Alternatively, the first stimulating unit 121 can be a warmth sensation presentation device equipped with a Peltier device, and can stimulate a cold sensation or a warmth sensation by varying the direction of the electric current applied to the Peltier device. Still alternatively, the first stimulating unit 121 can stimulate a pain sensation using an electrical stimulation device that applies an electric stimulation by passing a stepped-up electric current, which has been stepped up using a Cockcroft-Walton generator, to an electrode disposed on a rubber sheet. Still alternatively, for example, the first stimulating unit 121 can be a tactile sensation presentation device equipped with a compact motor, and can stimulate a tactile sensation by rotating the compact motor and causing vibrations. The first stimulating unit 121 can have the shape of a glove, a ring, a shoe, a belt, or a vest for implementing the abovementioned technology; and a stimulation can be applied when the user wears the first stimulating unit 121. Alternatively, the first stimulating unit 121 can have the form similar to a seatbelt, a handle, or a pedal that is touched and used by the user at the time of having a virtual reality experience; and the abovementioned technology can be implemented.

The first stimulus sensation intensity measuring unit 122 measures a first stimulus sensation intensity indicating the intensity of the sensation of the stimulation felt in the first body part. For example, the first stimulus sensation intensity measuring unit 122 can be implemented using an electro dermal activity (EDA) sensor that detects the electrodermal activity state of the skin. An electro dermal activity sensor measures the electrodermal activity state of the skin according to the sweat secreted from the sweat glands (the eccrine sweat glands) on the skin. The electrodermal activity is broadly divided into the skin potential and the skin conductance. The skin potential is distinguished into the skin potential level and the skin potential reflex. The skin potential level represents the direct-current component of the skin potential, and exhibits a high negative value when the arousal level is high. On the other hand, when sleepiness is experienced or when in a relaxed state, the skin potential level exhibits a positive value. The skin potential reflex represents the alternate-current component of the skin potential, and is frequently observed at the time of application of a stimulation for a pain sensation, a tactile sensation, an auditory sensation, a visual sensation, or a pressure sensation; or at the time of deep breathing or body movements; or at the time of doing mental calculations or doing thinking. Hence, as a result of measuring the skin potential reflex using an electro dermal activity sensor, it becomes possible to measure the intensity of the sensation of the stimulation.

Regarding Second Stimulation Device 130

The second stimulation device 130 stimulates a skin sensation in the second body part of the biological object. The second stimulation device 130 includes a second stimulating unit 131 and a second stimulus sensation intensity measuring unit 132. Regarding the constituent elements, the explanation is given below in a sequential manner.

The second stimulating unit 131 stimulates a skin sensation in the second body part of a biological object. Apart from the difference in the body part that gets stimulated, the second stimulating unit 131 is same as the first stimulating unit 121. Hence, that explanation is not given again.

The second stimulus sensation intensity measuring unit 132 measures a second stimulus sensation intensity indicating the intensity of the sensation of the stimulation felt in the second body part. Apart from the difference in the body part in which the intensity of the sensation of the stimulation is measured, the second stimulus sensation intensity measuring unit 132 is same as the first stimulus sensation intensity measuring unit 122. Hence, that explanation is not given again.

Regarding Control Unit 140

The control unit 140 is a controller that performs control. The control unit 140 is implemented when a central processing unit (CPU) or a micro processing unit (MPU) executes various computer programs, which are stored in the memory unit 150, using a random access memory (RAM) as the work area. Alternatively, the control unit 140 can be implemented using an integrated circuit such as an application specific integrated circuit (ASIC) or a field programmable gate array (FPGA).

As illustrated in FIG. 3, the control unit 140 includes an obtaining unit 141, an actuation control unit 142, and a stimulation intensity ratio calculating unit 143. The control unit 140 reads a computer program from the memory unit 150 and executes it so as to implement the constituent elements and perform the operations. The control unit 140 either can perform the operations using a single CPU, or can include a plurality of CPUs in which the operations are performed in parallel. Regarding the constituent elements, the explanation is given below in a sequential manner.

The obtaining unit 141 obtains the measurement value of the first stimulus sensation intensity as measured by the first stimulus sensation intensity measuring unit 122; obtains the measurement value of the second stimulus sensation intensity as measured by the second stimulus sensation intensity measuring unit 132; and obtains control command values issued by the actuation control unit 142 to the first stimulating unit 121 and the second stimulating unit 131. Upon obtaining a first-stimulating-unit control command value from the first stimulation device 120 and upon obtaining a second-stimulating-unit control command value from the second stimulation device 130, the obtaining unit 141 associates the obtained values to the date and time of measurement as indicated by the system clock; and stores that information in a measurement value storing unit 151.

The actuation control unit 142 controls the actuation of at least either the first stimulating unit 121 and the second stimulating unit 131. That is, the actuation control unit 142 at least either applies the first-stimulating-unit control command value to the first stimulating unit 121 or applies the second-stimulating-unit control command value to the second stimulating unit 131, and controls the corresponding actuation. The first-stimulating-unit control command value and the second-stimulating-unit control command value can be set based on the ratio calculated by the stimulation intensity ratio calculating unit 143. Moreover, as a result of controlling the actuation of at least either the first stimulating unit 121 or the second stimulating unit 131, the actuation control unit 142 not only controls the intensity of the stimulation but also the frequency of the stimulation that is applied by at least either the first stimulating unit 121 or the second stimulating unit 131.

The stimulation intensity ratio calculating unit 143 calculates the ratio regarding whether the second stimulus sensation intensity corresponds to the stimulation applied to the first body part or corresponds to the stimulation applied to the second body part. The second stimulus sensation intensity corresponding to the stimulation applied to the first body part, that is, corresponding to the sensation of the stimulation felt in the second body part represents the stimulus sensation based on the biological feedback implying that, when a stimulation is applied to some body part (the first body part) of a biological object, a stimulus sensation is generated in a different body part (the second body part) of the biological object. In the second stimulus sensation intensity, the rate of the sensation intensity occurring due to the stimulation applied to the first body part can be said to be the value indicating the ratio of the biological feedback; and hereinafter is called the biological feedback rate. More particularly, the stimulation intensity ratio calculating unit 143 uses the relationship of the first-stimulating-unit control command value, which is obtained when only the first-stimulating-unit control command value indicating the command value for the intensity of the stimulation of the first part is provided from among the second stimulus sensation intensity, with the second stimulus sensation intensity; and, in an identical manner to the first body part, in the second body part too, under the assumption that the second stimulus sensation intensity would be measured, can calculate the biological feedback rate, which indicates the ratio regarding whether the second stimulus sensation intensity corresponds to the stimulation applied to the first body part or corresponds to the stimulation applied to the second body part, for the first-stimulating-unit control command value. That is, the second stimulus sensation intensity that is generated in the second body part when a stimulation is applied to the first stimulating unit 121 as well as the second stimulating unit 131 represents the stimulus sensation having a mix of the stimulus sensation occurring in the second body part due the stimulation applied by the first stimulating unit 121 and the stimulus sensation occurring in the second part due to the stimulation applied by the second stimulating unit 131. Thus, it can be said that the stimulation intensity ratio calculating unit 143 calculates the value of multiplication of the ratio between the first-stimulating-unit control command value and the second-stimulating-unit control command value and the ratio between the sensitivity of the stimulus sensation intensity of the first body part with respect to the first-stimulating-unit control command value and the sensitivity of the stimulus sensation intensity of the second body part with respect to the second-stimulating-unit control command value.

The memory unit 150 is a storage device used in storing a variety of information. The memory unit 150 can be implemented using a main storage device and an auxiliary storage device. The main storage device can be implemented using a semiconductor memory device such as a random access memory (RAM), a read only memory (ROM), or a flash memory. An auxiliary storage device can be implemented using, for example, a hard disk, a solid state drive (SSD), an optical disc, or a memory card.

As illustrated in FIG. 3, the memory unit 150 includes the measurement value storing unit 151 and a model storing unit 152.

Regarding Measurement Value Storing Unit 151

The measurement value storing unit 151 is used to store the information related to the measurement values. Explained below with reference to FIG. 4 is an example of the information stored in the measurement value storing unit 151. FIG. 4 is a diagram illustrating an example of the information stored in the measurement value storing unit according to the application concerned.

In the example illustrated in FIG. 4, in the measurement value storing unit 151, the information about the following items is stored in a corresponding manner: "date and time of measurement", "first-stimulating-unit control command value", "first stimulus sensation intensity measurement value", "second-stimulating-unit control command value", and "second stimulus sensation intensity measurement value".

The item "date and time of measurement" indicates the date and time of measurement of various measurement values. The item "first-stimulating-unit control command value" indicates the control command values issued to the first stimulating unit 121. The item "first stimulus sensation intensity measurement value" indicates the measurement values of the intensity of the tactile sensations in the first body part as measured by the first stimulus sensation intensity measuring unit 122. The item "second-stimulating-unit control command value" indicates the control command values issued to the second stimulating unit 131. The item "second stimulus sensation intensity measurement value" indicates the measurement values of the intensity of the tactile sensation in the second body part as measured by the second stimulus sensation intensity measuring unit 132.

Thus, in FIG. 4, it is indicated as an example that the first-stimulating-unit control command value "FRCTR #1" is issued at the day and time of measurement "TIME #1", and the first stimulus sensation intensity measurement value "FRMES #1" is generated due to the concerned stimulation. Moreover, it is indicated as an example that the second-stimulating-unit control command value "SCCTR #1" is issued in an identical manner, and the second stimulus sensation intensity measurement value "SCMES #1" is generated due to the concerned stimulation.

Meanwhile, the information stored in the measurement value storing unit 151 is not limited to the information about the items "date and time of measurement", "first-stimulating-unit control command value", "first stimulus sensation intensity measurement value", "second-stimulating-unit control command value", and "second stimulus sensation intensity measurement value". Thus, the information related to other arbitrary measurement values can also be stored in the measurement value storing unit 151. For example, the biological information of the user such as the temperature or the heart rate of the user at the time of the measurement can also be stored in a corresponding manner.

Regarding Model Storing Unit 152

The model storing unit 152 is used to store models. FIG. 5 is a diagram illustrating an example of the information stored in the model storing unit according to the application concerned.

In the example illustrated in FIG. 5, in the model storing unit 152, the information related to items "model ID" and "model data" is stored in a corresponding manner.

The item "model ID" indicates the identifiers that enable identification of machine learning models and that are expressed using character strings or numbers. The item "model data" indicates the model data of the machine learning models. For example, the machine learning models can be neural networks. When a machine learning model is a neural network, model data "MDT #1" contains a variety of information such as binding information indicating the manner in which nodes included in each of a plurality of layers of the neural network are bound to each other, and binding coefficients that are multiplied to the numerical values input and output among the bound nodes.

That is, in FIG. 5, it is indicated that the model data "MDT #1" is the model data of the machine learning model identified by a model ID "MID #1".

Meanwhile, the information stored in the model storing unit 152 is not limited to the information related to the items "model ID" and "model data". Thus, the information related to other arbitrary machine learning models can also be stored in the model storing unit 152.

Configuration of Biological Sensation Expansion Device

Figure 6:
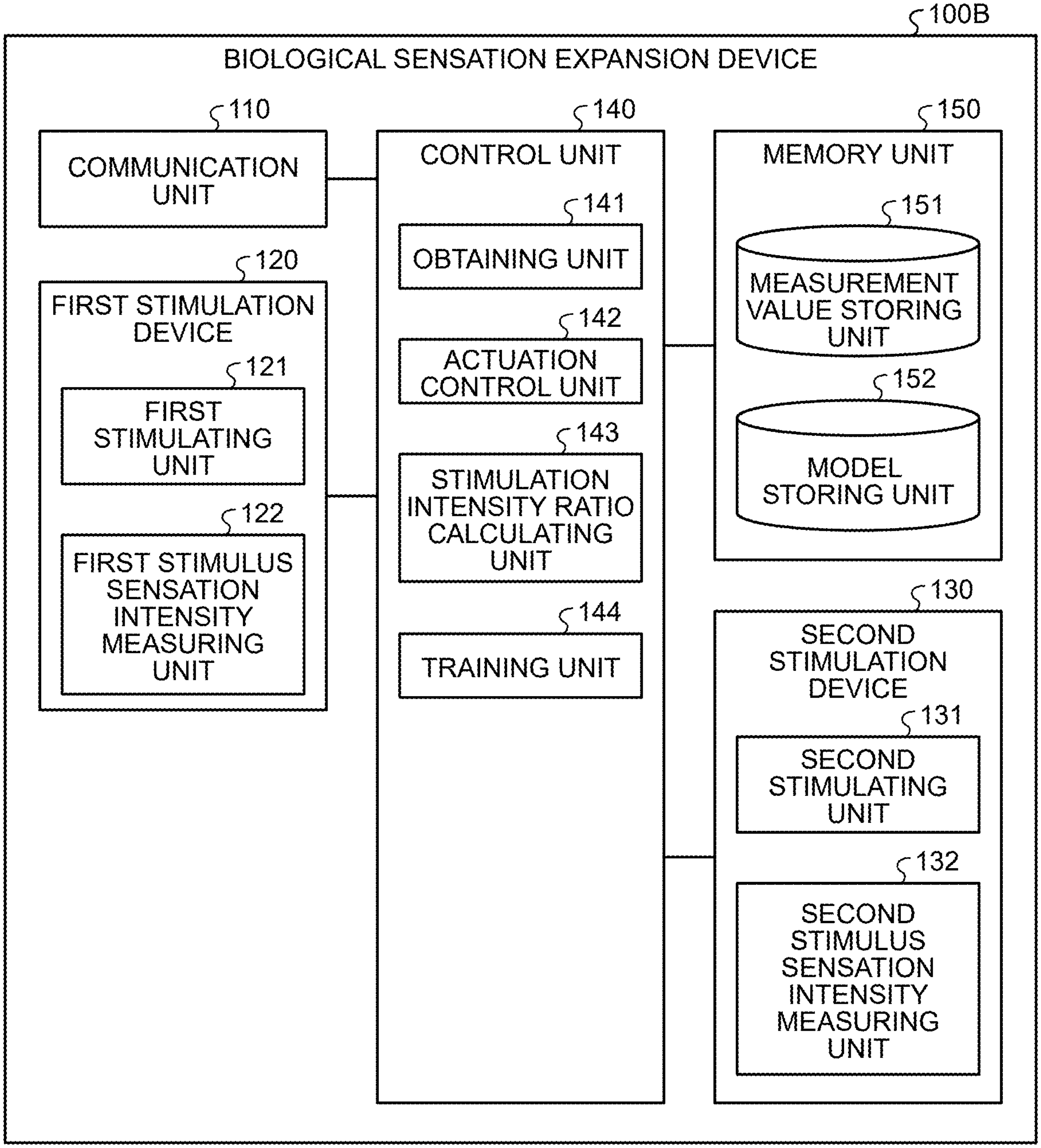
FIG. 6 is a diagram illustrating an exemplary configuration of the biological sensation expansion device according to the application concerned.

Explained below with reference to FIG. 6 is a configuration of the biological sensation expansion device 100B. FIG. 6 is a diagram illustrating an exemplary configuration of the biological sensation expansion device according to the application concerned. As illustrated in FIG. 6, the biological sensation expansion device 100B according to the application concerned includes the communication unit 110, the first stimulation device 120, the second stimulation device 130, the control unit 140, and the memory unit 150. Of the configuration of the biological sensation expansion device 100B according to the application concerned, the constituent elements other than a training unit 144 of the control unit 140 are same as the biological feedback detection device 100A. Hence, of the configuration of the biological sensation expansion device 100B according to the application concerned, the following explanation is given only about the training unit 144 that is a different constituent element than the constituent elements of the biological feedback detection device 100A, and the remaining configuration is not explained again.

The training unit 144 controls the first-stimulating-unit control command value and the second-stimulating-unit control command value, which are applied to the first stimulating unit 121 and the second stimulating unit 131, respectively, and ensures that the biological feedback is enhanced. More particularly, the training unit 144 performs control to enhance the intensity of the stimulation applied by the first stimulating unit 121, and at the same time performs control to reduce the intensity of the stimulation applied by the second stimulating unit 131 and to enhance the stimulus sensation intensity occurring in the second body part due to the tactile stimulation applied to the first body part by the first stimulating unit 121. That is, the training unit 144 performs control to maintain the first-stimulating-unit control command value applied to the first stimulating unit 121 at a constant value, and at the same time performs control to reduce the second-stimulating-unit control command value applied to the first stimulating unit 121 and to enhance the stimulus sensation intensity occurring in the second body part due to the tactile stimulation applied to the first body part by the first stimulating unit 121.

The training unit 144 can control the intensity and the frequency of the stimulations applied by the first stimulating unit 121 and the second stimulating unit 131 based on the biological feedback rate calculated by the stimulation intensity ratio calculating unit 143. If the biological feedback rate is equal to or smaller than a threshold value, the intensity of the stimulations is maintained; and, when the biological feedback rate exceeds the threshold value, the stimulation to be applied by the second stimulating unit 131 is reduced in intensity. In this way, the training is performed to keep the biological feedback rate high. For example, the training unit 144 can vary either only the intensity of the stimulations, or only the frequency of the stimulations, or the intensity and the frequency of the stimulations that are applied by the first stimulating unit 121 and the second stimulating unit 131. Moreover, the training unit 144 can control the first stimulating unit 121 and the second stimulating unit 131 in such a way that the stimulations applied by the first stimulating unit 121 and the second stimulating unit 131 have a large difference in the intensities.

For example, the training unit 144 stimulates the first body part according to a stimulation method in which the stimulation to be used for producing a sensation in the second body part is easy to recognize. When the stimulation to be used for producing a sensation in the second body part is a poking stimulation, the first body part is applied with a strong stimulation within a short period of time. When the stimulation to be used for producing a sensation in the second body part is a shaking stimulation, the first body part is applied with a stimulation that undergoes changes in intensity (strength) on a periodic basis.

The effect of the training of the biological feedback is different with each person, and the training can be carried out in a suitable manner for each user. For example, the training can be performed in such a sequence of stimulations, from among the skin sensations such as the tactile sensation, the pressure sensation, the pain sensation, the cold sensation, and the warmth sensation, that the user who is taking the training is easily able to feel the sensation in the second body part due to the stimulation applied to the first body part. Thus, for each user, it is possible to select the manner of applying the stimulation due to which a sensation is easily produced in the second body part, such as a strong stimulation within a short period of time or a stimulation that undergoes changes in the intensity (strength) on a periodic basis; and the stimulation can be applied according to the selected manner. Based on the biological feedback rate calculated by the stimulation intensity ratio calculating unit 143, the training unit 144 can select the type of stimulation (skin sensation) that can easily produce a sensation in the second body part of each user, and can select the manner of applying the selected stimulation. For each user, the stimulation application manner having a high biological feedback rate can be selected as the manner of applying the stimulation that can easily produce a sensation in the second body part. Moreover, the sensation felt in the second body part of each user can be learnt, and the manner of applying the stimulation in the first body part can be accordingly controlled.

At the time of carrying out the training, the stimulations applied to the first body part and the second body part can be associated to the videos and the audios present in the virtual reality, and the training can be carried out.

In this way, the biological sensation expansion device 100B performs control in such a way that, even when the intensity of the stimulation applied to the first body part is reduced, the stimulus sensation intensity felt in the second body part is enhanced. For that reason, it becomes possible to provide the biological sensation expansion device 100B that is capable of presenting a variety of stimulations.

Biological Sensation Expansion Method and Computer Program Product

Figure 7:
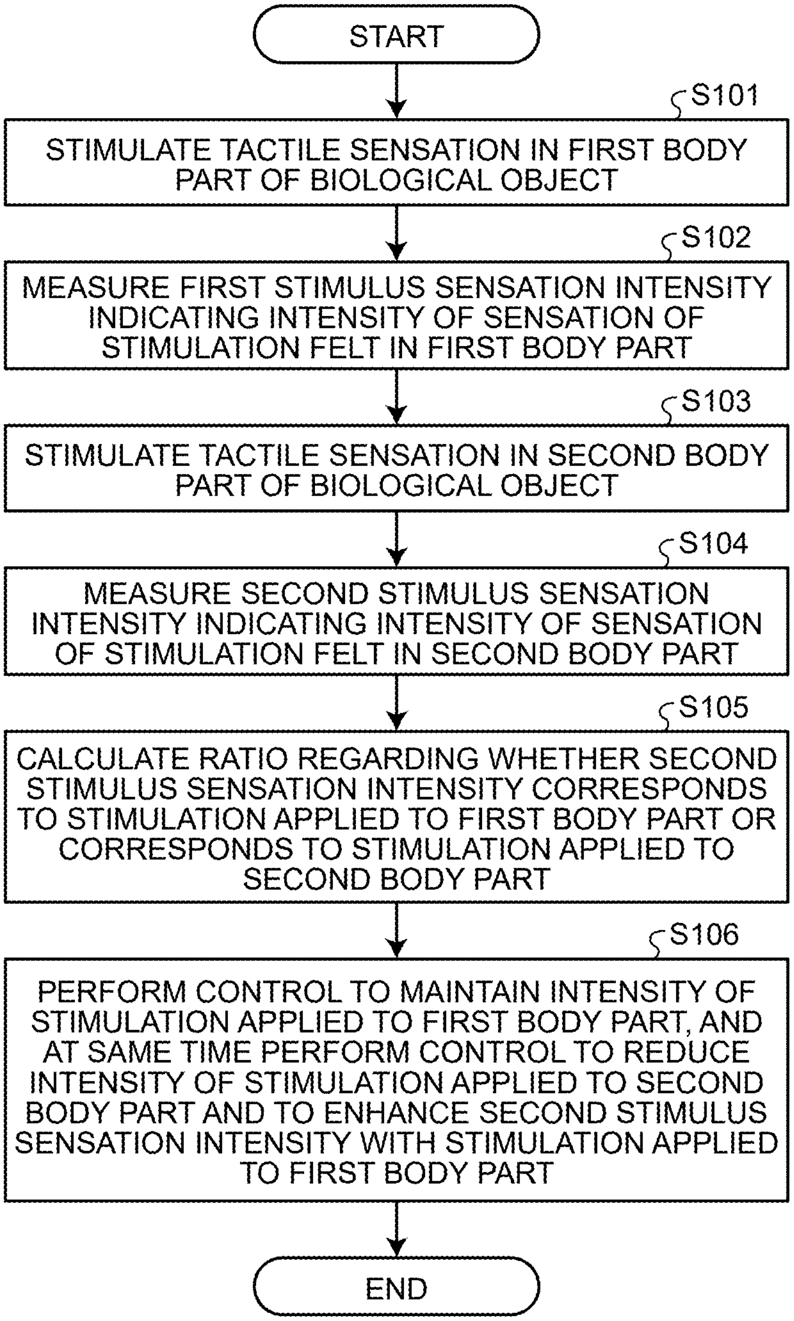
FIG. 7 is a flowchart for explaining the flow of a biological sensation expansion method according to the application concerned.

Explained below with reference to FIG. 7 are the biological sensation expansion method and the computer program product according to the application concerned. FIG. 7 is a flowchart for explaining the flow of the biological sensation expansion method according to the application concerned. Thus, the biological sensation expansion method and the computer program product according to the application concerned are explained with reference to the flowchart illustrated in FIG. 7.

Firstly, the biological sensation expansion device 100B applies a tactile stimulation to the first body part of the biological object (Step S101). Then, the biological sensation expansion device 100B measures the first stimulus sensation intensity indicating the intensity of the sensation of the stimulation felt in the first body part (Step S102). Subsequently, the biological sensation expansion device 100B applies a tactile stimulation to the second body part of the biological object (Step S103). Then, the biological sensation expansion device 100B measures the second stimulus sensation intensity indicating the intensity of the sensation of the stimulation felt in the second body part (Step S104). Subsequently, the biological sensation expansion device 100B calculates the ratio regarding whether the second stimulus sensation intensity corresponds to the stimulation applied to the first body part or corresponds to the stimulation applied to the second body part (Step S105). Then, the biological sensation expansion device 100B performs control to maintain the intensity of the stimulation applied to the first body part, and at the same time performs control to reduce the intensity of the stimulation applied to the second body part and to enhance the second stimulus sensation intensity with the stimulation applied to the first body part (Step S106). Meanwhile, since the effect of the feedback is believed to be different with each user, the manner of applying the stimulation at Steps S101 and S103 can be changed depending on the individual person.

As a result, it becomes possible to perform control to enhance the stimulus sensation intensity that occurs in the second body part due to the tactile stimulation applied to the first body part by the first stimulating unit 121. For that reason, it becomes possible to provide the biological sensation expansion method and the computer program product that enable contributing in the presentation of a variety of tactile stimulations.

Configuration and Effect

The biological feedback detection device 100A according to the application concerned includes: the first stimulating unit 121 that stimulates a tactile sensation in the first body part of the biological object; the second stimulating unit 131 that stimulates a tactile sensation in the second body part of the biological object; the second stimulus sensation intensity measuring unit 132 that measures the second stimulus sensation intensity indicating the intensity of the sensation of the stimulation felt in the second body part; and the stimulation intensity ratio calculating unit 143 that calculates the ratio regarding whether the second stimulus sensation intensity corresponds to the stimulation applied to the first body part or corresponds to the stimulation applied to the second body part.

With such a configuration, it becomes possible to calculate the ratio regarding whether the second stimulus sensation intensity corresponds to the stimulation applied to the first body part or corresponds to the stimulation applied to the second body part. Hence, it becomes possible to provide the biological feedback detection device 100A that is capable of contributing in the presentation of a variety of tactile stimulations.

The biological sensation expansion device 100B according to the application concerned includes the first stimulating unit 121 that stimulates a tactile sensation in the first body part of the biological object; the second stimulating unit 131 that stimulates a tactile stimulation in the second body part of the biological object; the second stimulus sensation intensity measuring unit 132 that measures the second stimulus sensation intensity indicating the intensity of the sensation of the stimulation felt in the second body part; the stimulation intensity ratio calculating unit 143 calculates the ratio regarding whether the second stimulus sensation intensity corresponds to the stimulation applied to the first body part or corresponds to the stimulation applied to the second body part; and the training unit 144 that performs control to maintain the intensity of the stimulation applied by the first stimulating unit 121 at a constant value, and at the same time performs control to reduce the intensity of the stimulation applied by the second stimulating unit 131 and to enhance the stimulus sensation intensity occurring in the second body part due to the tactile stimulation applied to the first body part by the first stimulating unit 121.

With such a configuration, it becomes possible to perform control to enhance the stimulus sensation intensity occurring in the second body part due to the tactile stimulation applied to the first body part by the first stimulating unit 121. For that reason, it becomes possible to provide the biological sensation expansion device 100B that is capable of contributing in the presentation of a variety of tactile stimulations.

The biological sensation expansion device 100B according to the application concerned further includes the actuation control unit 142 that controls the actuation of at least either the first stimulating unit 121 or the second stimulating unit 131. When the stimulation occurring in the second body part due to the stimulation applied to the first body part by the first stimulating unit 121 becomes equal to or greater than a predetermined value, the actuation control unit 142 controls the second stimulating unit 131 to reduce the intensity of the stimulation applied by the second stimulating unit 131.

With such a configuration, when the stimulation occurring in the second body part due to the stimulation applied to the first body part by the first stimulating unit 121 becomes equal to or greater than a predetermined value, the second stimulating unit 131 can be controlled to reduce the intensity of the stimulation applied by the second stimulating unit 131. For that reason, it becomes possible to provide the biological sensation expansion device 100B that is capable of contributing in the presentation of a variety of tactile stimulations.

The biological sensation expansion method according to the application concerned includes stimulating a tactile sensation in the second body part of the biological object; measuring the second stimulus sensation intensity indicating the intensity of the sensation of the stimulation felt in the second body part; calculating the ratio regarding whether the second stimulus sensation intensity corresponds to the stimulation applied to the first body part or corresponds to the stimulation applied to the second body part; and performing control to maintain the intensity of the stimulation applied to the first body part, and at the same time to reduce the intensity of the stimulation applied to the second body part and to enhance the second stimulus sensation intensity with the stimulation applied to the first body part.

With such a configuration, it becomes possible to perform control to enhance the stimulus sensation intensity occurring in the second body part due to the tactile stimulation applied to the first body part by the first stimulating unit 121. For that reason, it becomes possible to provide the biological sensation expansion method that is capable of contributing in the presentation of a variety of tactile stimulations.

The computer program product according to the application concerned causes a computer to execute: stimulating a tactile sensation in the second body part of the biological object; measuring the second stimulus sensation intensity indicating the intensity of the sensation of the stimulation felt in the second body part; calculating the ratio regarding whether the second stimulus sensation intensity corresponds to the stimulation applied to the first body part or corresponds to the stimulation applied to the second body part; and performing control to maintain the intensity of the stimulation applied to the first body part, and at the same time to reduce the intensity of the stimulation applied to the second body part and to enhance the second stimulus sensation intensity with the stimulation applied to the first body part.

With such a configuration, it becomes possible to perform control to enhance the stimulus sensation intensity occurring in the second body part due to the tactile stimulation applied to the first body part by the first stimulating unit 121. For that reason, it becomes possible to provide the computer program product that is capable of contributing in the presentation of a variety of tactile stimulations.

According to the application concerned, it becomes possible to provide a biological feedback detection device, a biological sensation expansion device, a biological sensation expansion method, and a computer program product that enable presentation of a variety of tactile stimulations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A biological sensation expansion device comprising:

a memory that stores executable components; and a processor that executes executable components stored on a memory, the executable components comprising:

a first stimulating unit that stimulates a tactile sensation in a first body part of a biological object;

a second stimulating unit that stimulates a tactile sensation in a second body part of the biological object;

a first stimulus sensation intensity measuring unit that measures a first stimulus sensation intensity indicating intensity of sensation of a stimulation felt in the first body part;

a second stimulus sensation intensity measuring unit that measures a second stimulus sensation intensity indicating intensity of sensation of a stimulation felt in the second body part;

a stimulation intensity ratio calculating unit that calculates a ratio regarding whether the second stimulus sensation intensity corresponds to a stimulation applied to the first body part or corresponds to a stimulation applied to the second body part; and a training unit that, in response to determining that, for the second stimulus sensation intensity, a rate of sensation intensity occurring due to the stimulation applied to the first body part is equal to or less than a threshold value, performs control to maintain intensity of a stimulation applied by the first stimulating unit and a stimulation applied by the second stimulating unit, and in response to determining that, for the second stimulus sensation intensity, the rate of the sensation intensity occurring due to the stimulation applied to the first body part exceeds the threshold value, performs control to maintain intensity of the stimulation applied by the first stimulating unit, and to reduce at least one of intensity or frequency of the stimulation applied by the second stimulating unit and to enhance stimulus sensation intensity occurring in the second body part due to a tactile stimulation applied to the first body part by the first stimulating unit.

2. The biological sensation expansion device according to claim 1, wherein the executable components further comprise an actuation control unit that controls actuation of at least one of the first stimulating unit or the second stimulating unit, wherein in response to determining that a stimulation occurring in the second body part due to the stimulation applied to the first body part by the first stimulating unit becomes equal to or greater than a predetermined value, the actuation control unit controls the second stimulating unit to reduce intensity of a stimulation applied by the second stimulating unit.

3. The biological sensation expansion device according to claim 1, wherein a stimulation of a skin sensation applied by the first stimulating unit and the second stimulating unit is a least one of a tactile sensation, a pressure sensation, a pain sensation, a cold sensation, or a warmth sensation.

4. The biological sensation expansion device according to claim 3, wherein, based on the ratio calculated by the stimulation intensity ratio calculating unit, a type of stimulation is selected regarding skin sensation applied by the first stimulating unit and the second stimulating unit.

5. The biological sensation expansion device according to claim 1, wherein the stimulation intensity ratio calculating unit calculates the ratio based on at least one of the second stimulus sensation intensity in a case in which a stimulation is applied only to the first body part, or the second stimulus sensation intensity in a case in which a stimulation is applied to the first body part and a stimulation is applied to the second body part.

6. A biological sensation expansion method comprising:

stimulating a skin sensation in a first body part of a biological object;

stimulating a skin sensation in a second body part of the biological object;

measuring a first stimulus sensation intensity indicating intensity of sensation of a stimulation felt in the first body part;

measuring a second stimulus sensation intensity indicating intensity of sensation of a stimulation felt in the second body part;

calculating a ratio regarding whether the second stimulus sensation intensity corresponds to a stimulation applied to the first body part or corresponds to a stimulation applied to the second body part; and in response to determining that, for the second stimulus sensation intensity, a rate of sensation intensity occurring due to the stimulation applied to the first body part is equal to or less than a threshold value, performing control to maintain intensity of a stimulation applied to the first body part and the second boy part; and in response to determining that, for the second stimulus sensation intensity, the rate of the sensation intensity occurring due to the stimulation applied to the first body part exceeds the threshold value, performing control, to maintain intensity of the stimulation applied to the first body part, and to reduce at least one of intensity or frequency of the stimulation applied to the second body part and to enhance stimulus sensation intensity occurring in the second body part due to a tactile stimulation applied to the first body part.

* * * * *